Patented Feb. 9, 1932

1,844,563

UNITED STATES PATENT OFFICE

LEO P. CURTIN, OF CRANBURY, NEW JERSEY

PROCESS FOR RECOVERING BROMINE

No Drawing. Application filed July 31, 1930. Serial No. 472,200.

This invention is a novel process for recovering bromine in its elemental form from dilute or concentrated solutions of salts of bromine without the intermediate formation of hydrogen bromide, bromides, bromates, or other salts with bromine.

Present methods of manufacture of bromine usually involve liberation of bromine by the addition of chlorine to compounds of bromine, then removal of the bromine as a gas by steam distillation or a current of air. The gaseous bromine is then absorbed in an alkaline solution, from which it may be recovered as a bromide or hypobromite. These methods apply to solutions of bromine which are dilute; if concentrated solutions of bromine are available, the pure substance may be recovered directly by gasification, followed by condensation of the bromine and accompanying water vapor.

As most solutions which are commercially available for the manufacture of bromine contain bromides of concentration 1% or very much less, a means for concentrating the bromine and separating it from accompanying air or steam without the formation of intermediate chemical compounds is desirable.

I have found that, under proper conditions, it is possible to adsorb bromine from the vapor phase by the use of a suitable activated adsorbent, and, at the same time, eliminate the other gases which accompany the vaporized bromine.

It has long been known that charcoal and other forms of carbon which have a very high ratio of surface to mass have considerable capacity for adsorbing bromine. While these substances work best when the bromine is gasified, they will also adsorb some bromine from an aqueous solution. It is, however, very difficult to recover bromine from carbonaceous adsorbing material. In case the gases are completely anhydrous, the bromine is held so tenaciously, that all of it is not removed by heating the carbon to red heat, at which temperature the effectiveness of the adsorbent may be considerably impaired for future use. If there is even a trace of water present, most of the bromine is recovered as hydrogen bromide.

I have found that silica gel, a hydrated form of silicon dioxide, is very efficient as an adsorbent for bromine, without any of the disadvantages attendant upon the use of activated carbons for this purpose. It is desirable to bring the bromine into contact with the silica gel under anhydrous conditions, since the silica gel is also an excellent adsorbent of water, and, if water be present, the yield of bromine is substantially reduced. My preferred procedure is as follows:

Bromine is liberated from its compounds in aqueous solution by the addition of the theoretical quantity of chlorine. The resulting solution of bromine is then subjected to the action of a current of air, or other inert gas, preferably by counter-current scrubbing, for the purpose of removing the bromine as vapor. The air, or gas, which is preferably at the ordinary temperature, is then passed through a dehydrating apparatus, such as a calcium chloride tower, which removes water vapor, but has no action on the bromine. This dehydrating operation may be carried out in successive stages, using one or more dehydrating agents, as for example, anhydrous sodium sulphate and calcium chloride. The anhydrous air, charged with bromine gas, is then brought in contact with silica gel, which is free of water, and which has preferably been activated by heating to a temperature of 400 to 500° C., and then cooled. The silica gel quantitatively adsorbs the bromine, changing in color from colorless to blackish red. After the silica gel has taken up its maximum charge of bromine, it is strongly heated. This drives out the bromine as gas, or vapor, which may be condensed to liquid in suitable apparatus. The heating operation reactivates the silica gel for the next charge. Steam may also be used to drive out the bromine, although this is regarded as less desirable. With a bromine solution of 0.5% concentration, it is found that the silica gel will adsorb 11% to 12% of its own weight of bromine. By altering the conditions, the yield may be slightly greater or less.

Silica gel is particularly advantageous because it is incapable of entering into chemical reaction with the adsorbed bromine. Bromine is a mixed acid anhydride (yielding hydrobromic and hypobromous acids), and silica gel is also the anhydride of a very weak acid. Other non-carbonaceous adsorbents, such as fuller's earth, may be used, but in general, such substances are not so efficient as silica gel.

One of the problems in connection with the process is partial or complete dehydration to regenerate the materials which are used to remove the water vapor from the air which is carrying the bromine vapor. The expense of performing this operation is the limiting factor in the process and determines how low a concentration of bromine may be treated with profit. This moisture may, of course, be driven off with heat. If a substance like sodium sulphate, which effloresces readily, is used in the first stage of dehydration, it will lose most of its moisture on exposure to ordinary air. The anhydrous air which has given up its bromine to the silica gel may be used to remove at least a part of the moisture from the dehydrating system by causing it to pass through in the opposite direction from its original path. This air may be heated to increase its efficiency if desired.

The process is in general intended to work at the ordinary temperature and pressure. The application of heat may be desirable in certain cases, and the adsorption of the bromine from a gas at greater than atmospheric pressure may be desirable when working with very dilute solutions. Also, a vacuum may be employed in vaporizing the bromine in aqueous solution, and also in recovering it from the silica gel. These modifications are considered to be part of the process. The invention is applicable also to the recovery of iodine. Instead of silica gel other highly adsorptive oxide gels (alumina, etc.) may be used.

I claim:

1. Process of recovering bromine from solutions thereof, comprising vaporizing the bromine in a current of gas, and adsorbing it therefrom by an oxide gel.

2. Process of recovering bromine, comprising dehydrating a gas-stream carrying bromine, and adsorbing bromine therefrom by an oxide gel.

3. Process of recovering bromine from aqueous solutions thereof, comprising vaporizing the bromine in a current of gas, dehydrating the gas stream, and adsorbing bromine therefrom by an oxide gel.

4. Process of recovering bromine, comprising dehydrating a gas stream carrying bromine, adsorbing bromine therefrom by an oxide gel, and utilizing the anhydrous effluent gas to regenerate the dehydrating agent.

5. The herein-described process of recovering bromine from solutions of its salts, comprising liberating elemental bromine by means of chlorin, vaporizing the bromine in a current of gas, dehydrating the gas stream, adsorbing bromine therefrom by an oxide gel, and distilling and condensing the bromine.

6. The herein-described process of recovering bromine from solutions of its salts, comprising liberating elemental bromine by means of chlorin, vaporizing the bromine in a current of gas, dehydrating the gas stream, adsorbing bromine therefrom by an oxide gel, utilizing the effluent gas to regenerate the dehydrating agent, and distilling and condensing the bromine.

7. Process of recovering a halogen from aqueous solutions thereof, comprising vaporizing the halogen in a current of gas, dehydrating the gas stream, and adsorbing the halogen therefrom by an oxide gel.

8. Process of recovering bromine, comprising dehydrating a gas-stream carrying bromine, and adsorbing bromine therefrom by a non-carbonaceous adsorbent.

9. Process of recovering a halogen from equeous solutions thereof, comprising vaporizing the halogen in a current of gas, dehydrating the gas stream, and adsorbing the halogen therefrom by a non-carbonaceous adsorbent.

In testimony whereof, I affix my signature.

LEO P. CURTIN.